Dec. 9, 1952   H. C. WINKEL   2,621,219
BATTERY GRID
Original Filed June 24, 1946   3 Sheets-Sheet 1
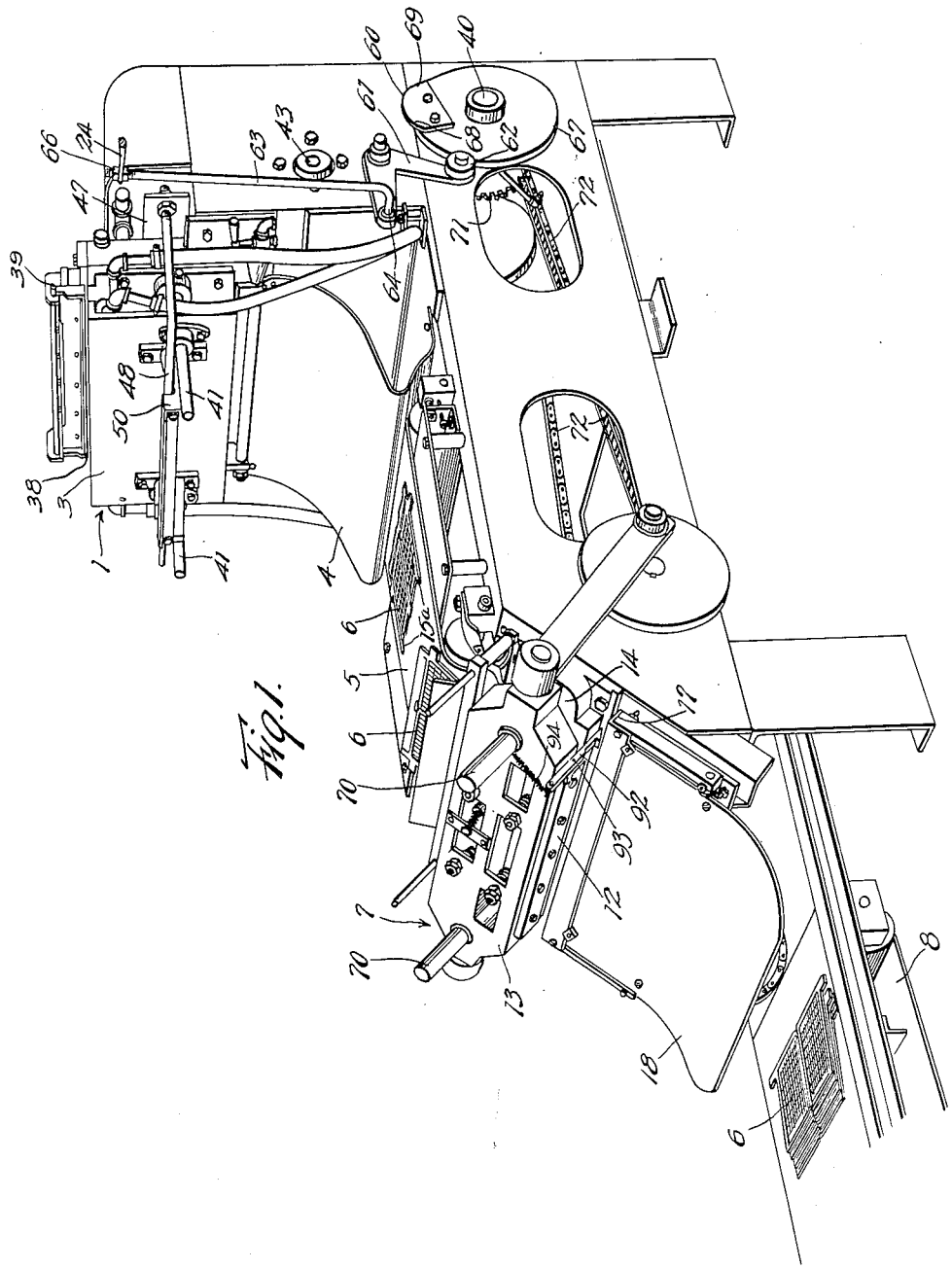
Inventor:
Herbert C. Winkel
By Thiess, Olson & Mecklenburger
Attys.

Dec. 9, 1952            H. C. WINKEL            2,621,219
BATTERY GRID
Original Filed June 24, 1946            3 Sheets-Sheet 2
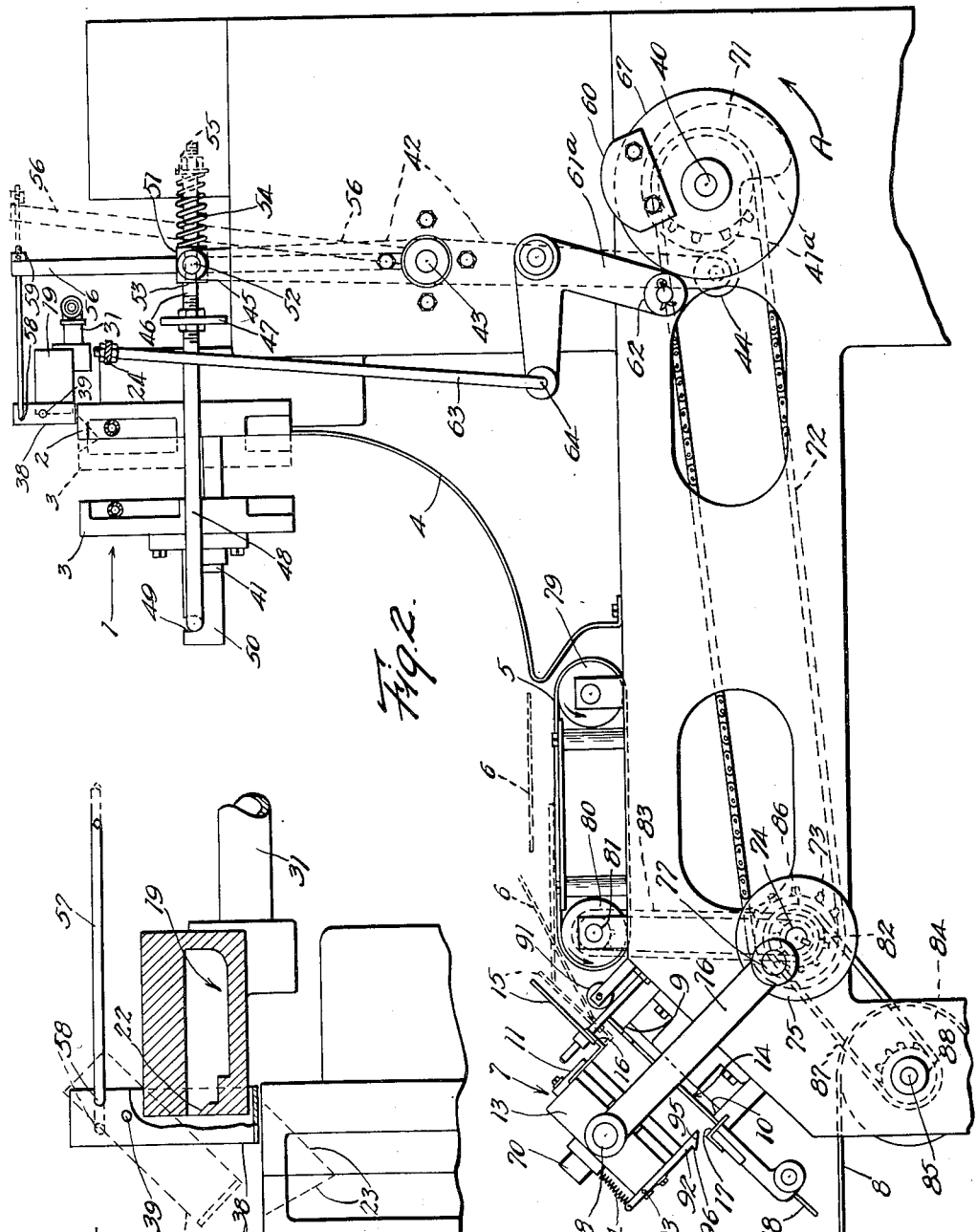
Inventor:
Herbert C Winkel
By Thiess, Olsen & Mecklenburger
Attys Dec. 9, 1952  H. C. WINKEL  2,621,219
BATTERY GRID
Original Filed June 24, 1946  3 Sheets-Sheet 3
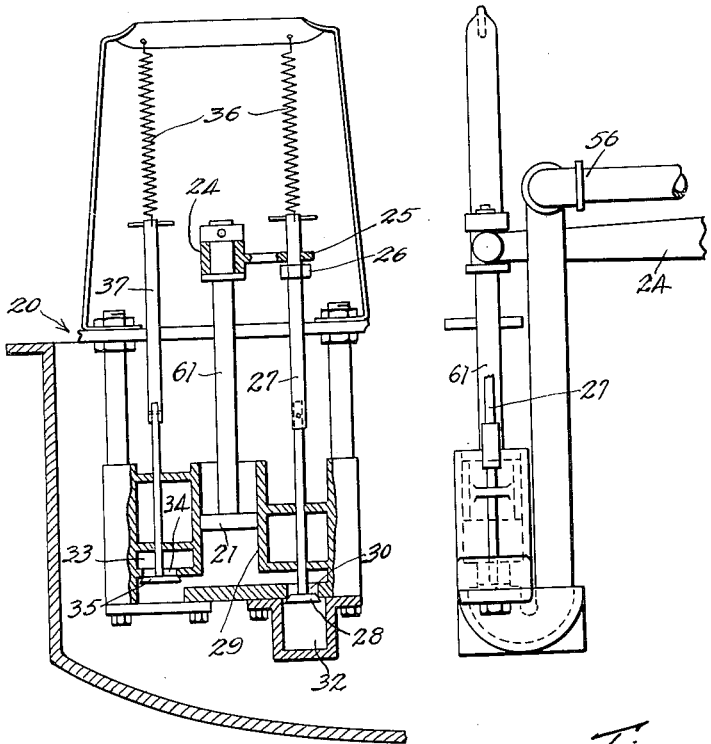
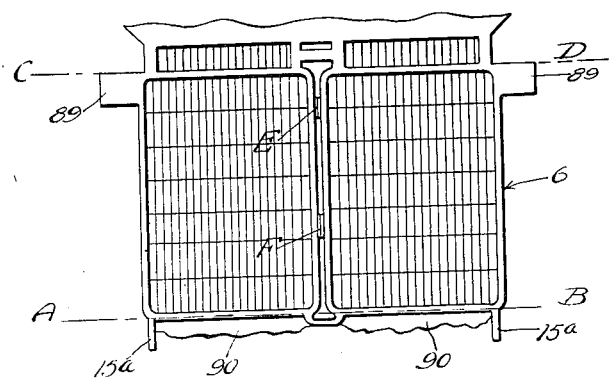
Inventor:
Herbert C. Winkel Patented Dec. 9, 1952

2,621,219

UNITED STATES PATENT OFFICE 2,621,219

BATTERY GRID

Herbert C. Winkel, Watervliet, Mich.

Original application June 24, 1946, Serial No. 678,770. Divided and this application August 1, 1950, Serial No. 177,110

2 Claims. (Cl. 136—36)

My invention relates to battery grids.

This application is a division of my copending application Serial No. 678,770, filed June 24, 1946.

One of the objects of my invention is to provide an improved battery grid having locating lugs on its advance edge for engagement with holding and positioning devices on a grid trimming apparatus.

Further objects and advantages of the invention will be apparent from the description and claims.

In the drawings, in which an embodiment of my invention is shown,

Figure 1 is a perspective view of a battery grid molding and trimming machine embodying my invention;

Fig. 2 is a side elevational view of the machine;

Fig. 3 is a part sectional, part elevational view of a pump for the molten metal;

Fig. 4 is a side elevational view of the construction of Fig. 3;

Fig. 5 is a sectional view showing the drip catching apparatus; and

Fig. 6 is a plan view of an untrimmed battery grid.

Referring to the drawings in detail, the battery grid molding and trimming machine shown comprises a grid-molding apparatus 1, including a pair of relatively reciprocable molds 2 and 3 separable along a substantially vertical plane, an arcuate slide 4 on which the grid falls when the molds are opened, curved to direct the grid from its vertical position to a substantially horizontal position, a horizontal endless conveyor 5 to which the grid 6 is delivered from the curved slide 4, a grid edge trimmer 7 adjacent the delivery end of the conveyor 5 to which the conveyor delivers the grid, and a horizontal endless conveyor 8 to which the trimmer 7 delivers the grid.

The trimmer 7 comprises a pair of stationary trimming edges 9 and 10, one for the front and one for the rear edge of the grid, and a pair of reciprocating shearing blades 11 and 12 mounted on a reciprocable head 13, the movable blades 11 and 12 co-operating with the stationary blades 9 and 10, respectively. The trimmer has a grid-supporting face 14 inclined downwardly and away from the delivery end of the endless conveyor 5, along which face the grid slides to trimming position.

The grids are fed to the trimmer in timed relation with respect to the operation of the trimmer by a grid stop plate 15 mounted on leader pins 15$^b$ caused to reciprocate in timed relation to the trimmer head 13. When the stop plate is in stop position, it will be engaged by the lugs 15$^a$ cast on the front edge of the grid being fed forwardly by means of the endless conveyor 5. This will hold the grid against further movement, the conveyor simply sliding underneath the grid. The stop plate will be held in stop position during a substantial portion of the trimming movement of the trimmer head. When the trimmer head is approaching its upper position, the hooks 16 on the trimmer head will engage underneath the stop plate 15 and lift it out of its obstructing position so that the conveyor 5 can feed the grid forwardly to a position in which it will be delivered and slide onto the inclined grid-supporting face 14 of the trimmer 7.

For stopping the grid in correct trimming position an oscillatable stop bar 17 is provided which, in grid-locating position, is engaged by the pair of forwardly-extending lugs 15$^a$ which are cast on the grid. These lugs are at opposite sides of the grid casting, thus affording widely spaced supports for the grid while being trimmed.

As soon as the trimmer head has trimmed the edges of the plate and the reciprocable shearing blades 11 and 12 have lifted clear of the stationary shearing blades 9 and 10, the further upward movement of the trimmer head will lift the pivoted retaining bar 17 and allow the trimmed grid 6 to fall down onto the guide 18 leading to the endless conveyor 8. This endless conveyor 8 is driven at such a rate that it will advance about one inch for each plate trimmed and delivered to it. This will cause the plates to be arranged in a shingle formation on the endless conveyor 8. This shingle-like arrangement facilitates the later handling of the grids as they can be pushed together by taking hold of two widely separated grid castings with two hands and moving them together to cause the plates to slide into a stacked formation.

In order to deliver measured quantities of molten metal periodically to the overflow receptacle 19 for the molten metal, a piston and cylinder pump 20 is provided, driven in timed relation to the opening and closing of the grid mold 3 so as to deliver the molten material to the receptacle 19 at a time when the grid mold 3 is closed. As will be described later, the receptacle is left almost full of molten metal after each discharge stroke of the piston 21. On the next discharge stroke of the piston 21, the molten metal will be delivered to the receptacle 19 and will soon flow over the weir 22 into the flaring entrance 23 to the mold cavity.

In order to prevent accidental slopping over of the receptacle when the grid mold is open, means are provided for withdrawing a small portion of the molten metal from the receptacle during the first part of the charging stroke of the piston 21. For this purpose, the actuating lever 24 for the piston 21 is provided with a laterally extending arm 25 which engages a collar 26 secured to the discharge valve stem 27 which will prevent the discharge valve 28 from closing against its seat until the piston 21 has moved upwardly on its charging stroke sufficiently to lift the laterally extending arm 25 clear of the valve stem collar 26. During this charging stroke of the piston, some of the molten metal in the overflow receptacle 19 will be drawn back into the cylinder 29 through the discharge port 30. The apparatus may be so designed and adjusted that the discharge valve 28 will remain open to enable just the desired amount of molten metal to be withdrawn from the overflow receptacle 19.

The communication between the overflow receptacle 19 and the discharge valve port 30 is through the pipe 31 leading from the bottom of the overflow receptacle to the chamber 32 underneath the discharge valve port 30. Molten metal is supplied to the chamber 33 above the inlet valve from any suitable source, from whence it flows through the inlet valve port 34 into the cylinder 29 when the inlet valve 35 opens. Suitable valve closing springs 36 are provided secured to the upper ends of the valve stems 27 and 37. The high specific gravity of the molten lead also aids in closing the valves.

In order to catch any drip from the overflow weir 22 at a time when the grid molds 2 and 3 are separated, a drip catcher 38 is provided pivotally mounted at 39 and operated in timed relation to the movement of the grid mold 3 so that when the grid mold is closed and the pump piston 21 is about to start on its discharge stroke, the drip catcher 38 will be moved to the dotted-line position shown, in which it will be out of the way of flow of molten metal over the discharge weir 22. Just before the grid mold begins to separate, the drip catcher 38 will be moved to the full-line position in which it will prevent any molten metal which may slop over the weir 22 from falling down over the face of the open grid mold 2.

*Operating transmissions.*—The opening and closing of the mold sections 2 and 3, the opening and closing of the drip catcher 38, the operation of the pump 20, horizontal conveyor 5, trimmer 7, and discharge conveyor 8 are all effected from a motor-driven shaft 40, rotatable in the direction of the arrow A in Fig. 2.

The movable mold section 3 is reciprocably mounted on a pair of leader pins 41 extending forwardly from the fixed mold section 2. The transmission from the drive shaft 40 to the movable mold section 3 comprises a cam member 41a secured to rotate with the drive shaft 40, a rock lever 42 secured to a rock shaft 43 and having a follower 44 at the end of its downwardly extending arm for engaging the cam 41a and having a lost motion pivotal connection at the upper end of the upwardly extending arm 45 with a connecting rod 46 secured to the crosshead 47 from which a yoke-shaped operating bar 48 extends into engagement with the notches 49 on the posts 50 secured to the movable mold section. The pivotal and sliding engagement of the upper end of the rock arm 45 with the connecting rod 46 is effected by means of a trunnion block 51 slidably mounted on the connecting rod 46 and having its trunnions 52 journalled in the forked end of the rock arm 45. The connecting rod is provided with a shoulder at 53 to limit the sliding movement of the trunnion block 51 on the connecting rod 46. In order to provide some capability for lost motion of the trunnion block on the connecting rod, a coil compression spring 54 is provided surrounding the connecting rod having one end bearing on the trunnion block and the other end bearing on a washer 55 secured to the connecting rod. This lost motion is necessary to enable the desired movement of the drip catcher as described hereinafter.

The transmission from the rotatable shaft 40 to the drip catcher 38 comprises a rock arm 56 secured to rotate with the cam-controlled rock shaft 43, and a connecting rod 57 having a lost motion connection with the upper end of this rock arm and having a pivotal connection 58 at its other end with the rockable drip catcher.

As the cam 41a rotates in the direction of the arrow A from a position in which the low portion of the cam is in engagement with the follower 47 to a position in which the high point of the cam is in engagement with the follower, the rock shaft 43 will be rocked clockwise, as seen in Fig. 2, to close the mold. During this closing movement of the mold, the upper end of the rock arm will move from the full-line position shown to the dotted-line position shown in Fig. 5, at which time it is in engagement with the collar 59 on the drip catcher connecting rod 57. The final cam-controlled movement of the rock shaft 43 after the mold cavity has been closed will compress the lost motion spring 54 and move the drip catcher connecting rod 57 to the right, as seen in Fig. 2, to move the drip catcher 38 out of the way of the flow over the discharge weir 22.

This final movement will also bring the pump cam 60 to a position where it will cause the discharge stroke of the pump, forcing molten metal into the receptacle 19 and causing the receptacle to overflow the weir 22 and deliver molten metal to the flaring entrance 23 to the mold cavity in a sufficient amount to fill the cavity. As the pump-controlling cam 60 moves to a position in which the pump 20 begins its charging stroke, a relatively small amount of molten metal will be withdrawn from the receptacle 19 back into the pump cylinder 29, the amount withdrawn being sufficient to prevent the receptacle 19 from slopping over due to jarring, or the like, when later on the mold is moved to open position.

The transmission from the rotatable drive shaft 40 to the pump piston rod 61 comprises the cam 60 secured to rotate with the shaft, a bell crank lever 61a having a follower 62 on its downwardly extending arm controlled by the cam 60, a connecting rod 63 pivotally connected at 64 with the other arm of the bell crank lever 61 and the rock lever 24 pivotally mounted at 65 and having one end secured at 66 to the upper end of the connecting rod 63 and its other end secured to the upper end of the pump piston rod 61. The discharge stroke and charging stroke of the pump are effected during a relatively small angular movement of the rotatable shaft by means of cam plate 60 secured so as to extend beyond the circular dwell portion 67 of the cam. The entire discharge and charging movement of the pump are effected from the time the cam plate 60 first engages the follower at 68 to the time at which the cam plate disengages the follower at 69.

The reciprocable shearing head 13 is mounted on a pair of leader pins 70 extending upwardly from the base of the shearing apparatus. The reciprocable movement of the shearing head from the rotatable shaft 40 is effected by means of a sprocket 71 secured to the rotatable shaft 40, a sprocket chain 72 running over this sprocket 71, a sprocket 73 secured to rotate with the crankshaft 74, a crank arm 75 secured to rotate with this crankshaft 74, and a connecting rod 76 pivotally secured at 77 to the crank arm and pivotally connected at 78 with the crosshead or shearing head 13. A similar crank arm and connecting rod (not shown) may be provided at the other end of the crosshead.

The horizontal feed conveyor 6 is supported on pairs of spaced sprockets 79 and 80. The sprocket 80 is secured to rotate with the shaft 81. This sprocket 81 is driven from the shaft 74 by means of a sprocket 82 mounted on a shaft, and a sprocket chain 83 running over this sprocket 82 and over the sprocket 80 on the shaft 81.

The horizontal delivery conveyor 8 is mounted to run over a sprocket 84 secured to rotate with the shaft 85. This conveyor is driven from the shaft 74 by means of a sprocket 86 secured to rotate with the shaft, a sprocket chain 87 running over this sprocket, and a sprocket 88 over which this chain 87 runs secured to rotate with the shaft 85.

The untrimmed grid 6 is shown in Fig. 6. It is provided with the usual lugs 89 which, when assembled in a battery, form the terminal post for the battery. In casting these battery grids, a flash or fin 90 forms on the lower edge of the grid, due to the impossibility of securing sufficiently accurate engagement of the adjacent mold sections at the bottom of the mold. In order to provide a grid casting which will engage properly with the grid-retaining feed bar 15 and the grid-retaining discharge bar 17, I cast on the advance edge of the grid casting a pair of positioning lugs 15a by use of the method and apparatus disclosed in my Patent No. 2,467,246, dated April 12, 1949. These lugs are cast sufficiently long so as to extend in advance of the most advanced portions of the overflow fin or flash. This enables the lugs 15a to engage the positioning bars of the trimming machine to position accurately the grid casting as it is being trimmed. The advance blade trims along the line A—B of Fig. 6 and the rear blade trims along the line C—D of Fig. 6. As indicated in Figs. 1, 2, and 6, the stop bar 17 is in advance of the shearing plane of the blades 11 and 12 a distance equal to the distance from the trim line A—B to the front edges of the stop lugs 15a. With the grid thus trimmed, it is a simple matter to break the two grid sections apart by hand, the fracture taking place at the two points E and F which are the only points of connection of the trimmed grid sections.

In order to facilitate the entry of the grid casting into the trimmer, a transversely-extending roller 91 may be mounted between the discharge end of the conveyor and the entrance edge of the trimmer.

In order to lift the locating bar 17 from its grid-holding position, a lifting hook 92 is provided pivotally mounted on the trimmer head 13 at 93 and spring-pressed toward the bar 17 by means of a coil tension spring 94. As the trimmer head moves down, the sloping edge 95 of the hook will engage the bar 17 and the hook will slide down past the lower edge of the bar and will then snap into position underneath the bar. After the trimmer head has effected its trimming operation and has moved upwardly sufficiently to disengage the shearing blade from the grid being trimmed, the shoulder 96 on the hook will engage the lower edge of the bar 17 and lift the bar upwardly to release the grid to enable it to slide underneath the bar onto the guide 18 and conveyor 8. As the shearing head 13 continues to move upwardly, the relative paths of movement of the retaining bar 17 and hook 92 will be such that the hook will disengage the bar, allowing it to drop downwardly into position to intercept the advance edge of the succeeding grid delivered to the grid trimmer.

Further modifications will be apparent to those skilled in the art and it is desired, therefore, that the invention be limited only by the scope of the appended claims.

Having thus described my invention, what I claim and desire to secure by Letters Patent is:

1. In an untrimmed battery grid casting having a fin or flash on one edge thereof, means forming a part of said casting for engagement with stop means to position said casting with respect to a trimming blade for a trimming operation designed to remove said fin or flash along a given trim line, said means including a pair of lugs extending outwardly of said one edge beyond said fin or flash and to a predetermined distance from said trim line, said lugs being of sufficient cross-section to withstand a substantial impact resulting from engagement of said lugs with said stop means.

2. In an untrimmed battery grid casting having a fin or flash on one edge thereof, means forming a part of said casting for engagement with stop means to position said casting with respect to a trimming blade for a trimming operation designed to remove said fin or flash along a given trim line, said means including a pair of lugs extending outwardly of said one edge, adjacent the ends of said edge, beyond said fin or flash, and to a predetermined distance from said trim line, said lugs being of sufficient cross-section to withstand a substantial impact resulting from engagement of said lugs with said stop means.

HERBERT C. WINKEL.

REFERENCES CITED

The following references are of record in the file of this patent:

UNITED STATES PATENTS

| Number | Name | Date |
| --- | --- | --- |
| 570,224 | Madden | Oct. 27, 1896 |
| 612,649 | Lloyd | Oct. 18, 1898 |
| 1,327,234 | Handler | Jan. 6, 1920 |
| 2,156,379 | Donath | May 2, 1939 |
| 2,253,280 | Lormor | Aug. 19, 1941 |
| 2,277,234 | Kerns | Mar. 24, 1942 |
| 2,378,221 | Huntsberger | June 12, 1945 |